(12) United States Patent
Sampath et al.

(10) Patent No.: US 6,519,552 B1
(45) Date of Patent: Feb. 11, 2003

(54) SYSTEMS AND METHODS FOR A HYBRID DIAGNOSTIC APPROACH OF REAL TIME DIAGNOSIS OF ELECTRONIC SYSTEMS

(75) Inventors: Meera Sampath, Penfield, NY (US); Ashok Godambe, Pittsford, NY (US); Eric Jackson, Penfield, NY (US); Edward W. Mallow, Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/522,082

(22) Filed: Mar. 10, 2000

Related U.S. Application Data

(60) Provisional application No. 60/154,016, filed on Sep. 15, 1999.

(51) Int. Cl.[7] ................................................ G06F 11/30
(52) U.S. Cl. ..................... 702/183; 702/183; 702/185
(58) Field of Search ................................ 702/183, 185, 702/182; 714/26

(56) References Cited

U.S. PATENT DOCUMENTS

| | | | |
|---|---|---|---|
| 4,071,911 A | | 1/1978 | Mazur |
| 4,086,434 A | | 4/1978 | Bocchi |
| 4,583,834 A | | 4/1986 | Seko et al. |
| 5,038,319 A | | 8/1991 | Carter et al. |
| 5,057,866 A | | 10/1991 | Hill, Jr. et al. |
| 5,084,875 A | | 1/1992 | Weinberger et al. |
| 5,358,606 A | * | 10/1994 | Makkonen ................... 162/49 |

(List continued on next page.)

FOREIGN PATENT DOCUMENTS

| | | |
|---|---|---|
| EP | 0 784 240 A2 | 7/1997 |
| EP | 0 854 632 | 7/1998 |

OTHER PUBLICATIONS

Manders E. J. et al.: "Signal Interpretation for Monitoring and Diagnosis, A Cooling System Testbed" IMTC/99. Proceedings of the 16th IEEE Instrumentation and Measurement Technology Conference (Cat. No. 99CH36309) Measurements for the New Millenium, Venice, Italy, vol. 1, May 24–26, 1999, pp. 498–503, XP002192411.

"Fault Diagnosis in Dynamic Systems Using Analytical and Knowledge–based Redundancy—A Survey and Some New Results," Paul M. Frank, Automatica, vol. 26, 90 International Federation of Automatic Control, 1990, pp. 459–474.

"Combining Expert System and Analytical Redundancy Concepts for Fault–Tolerant Flight Control," David A. Handelman et al., Princeton University, J. Guidance, vol. 12, No. 1, Jan.–Feb. 1989, pp. 39–45.

*Primary Examiner*—Marc S. Hoff
*Assistant Examiner*—Paul Kim
(74) *Attorney, Agent, or Firm*—Oliff & Berridge, PLC

(57) ABSTRACT

Through a combination of a hybrid diagnostic scheme based on qualitative and quantitative technologies, at least component level status information can be obtained about a machine, such as an electronic device. In particular, qualitative model based diagnostic technologies is used in conjunction with quantitative analysis techniques and signature analysis to achieve accurate and reliable diagnosis of components and systems down to the individual component level, for example, down to the consumer replaceable unit level. Thus, the hybrid diagnostic methodology exploits the diagnostic information content in already available system signals via intelligent processing and allows for diagnosis with minimal sensor requirements. Furthermore, the diagnostic methodology allows for a self-diagnosing machine having diagnostic intelligence which in turn can reduce service time, service costs, increased machine up time and improve customer satisfaction.

30 Claims, 9 Drawing Sheets

U.S. PATENT DOCUMENTS

| | | |
|---|---|---|
| 5,365,310 A | 11/1994 | Jenkins et al. |
| 5,406,502 A * | 4/1995 | Haramaty et al. .......... 702/183 |
| 5,510,876 A | 4/1996 | Hayashi et al. |
| 5,510,896 A | 4/1996 | Wafler |
| 5,537,644 A * | 7/1996 | Hamilton et al. ............. 395/10 |
| 5,580,177 A | 12/1996 | Gase et al. |
| 5,612,902 A | 3/1997 | Stokes |
| 5,619,307 A | 4/1997 | Machino et al. |
| 5,642,202 A | 6/1997 | Williams et al. |
| 5,680,541 A | 10/1997 | Kurosu et al. |
| 5,682,317 A * | 10/1997 | Keeler et al. ............... 701/101 |
| 5,694,528 A | 12/1997 | Hube |
| 5,727,135 A | 3/1998 | Webb et al. |
| 5,745,365 A * | 4/1998 | Parker ........................ 700/122 |
| 5,748,221 A | 5/1998 | Castelli et al. |
| 5,761,505 A | 6/1998 | Golson et al. |
| 5,808,908 A * | 9/1998 | Ghahramani ........... 364/551.01 |
| 5,864,773 A * | 1/1999 | Barna et al. ................... 702/85 |
| 5,884,118 A | 3/1999 | Mestha et al. |
| 5,892,451 A | 4/1999 | May et al. |
| 5,893,083 A | 4/1999 | Eshghi et al. |
| 5,960,374 A * | 9/1999 | Lausier ........................ 702/81 |
| 5,996,090 A * | 11/1999 | Hellerstein ................... 714/25 |
| 6,023,525 A | 2/2000 | Cass |
| 6,023,595 A | 2/2000 | Suzuki et al. |

\* cited by examiner

FIG. 8

| EVENT NUMBER | EVENT NAME |
|---|---|
| 1 | START DIAGNOSTICS (TRIGGER EVENT) |
| 3 | SOLENOID ON |
| 2 | FEED MOTOR ON |
| 4 | SOLENOID OFF |
| 6 | FEED MOTOR OFF, WAIT SENSOR LOW |
| 25 | CHECK PEAK CURRENT, CURRENT HIGH |
| 27 | CHECK SPECTRUM, SPECTRUM BROKEN |
| 18 | CHECK STACK HEIGHT COUNTER, COUNTER HIGH |
| 20 | CHECK FEED COUNTER, FEED COUNTER LOW |
| 19 | END DIAGNOSTICS |

Classifier: Off-Line Design Phase

For each cluster or group (i.e., the normal mode and each failure mode) run N sheet feeds on the copier/printer and acquire features.

For a chosen classifier structure (quadratic, linear, etc.) determine classifier parameters using standard statistical tools. (Example parameters; means, co-variances, and derived quantities thereof for each cluster)

On-Line Operation of Classifier

Compute distance of feature vector from each cluster:
(sample equation: $d_i^2(x) = (x-m_i)' S_i^{-1} (x-m_i) + \ln |S_i|$ )

↓

Determine closest cluster

↓

Output Cluster Number

---

If Diagnoser State = 7 and Next Event = Feed Motor Off & Wait Sensor Low
New Diagnoser State = 8: Suspected Failures = F1, F2, F3, F4, F6,

If Diagnoser State = 8 and Next Event = Check Peak Current & Peak Current
Medium New Diagnoser State = 9: Certain Failures = F4.

..................................................................................................................................

If Diagnoser State = 13 and Next Event = Check Stack Height Counter,
Stack Counter High.

New Diagnoser State = 16; Suspected Failures = F1, F6.

F1 - Tray Out of Paper
F2 - Broken Feed Motor
F3 - Broken Elevator Motor
F4 - Broken Solenoid
F5 - Degraded Solenoid
F6 - Broken Feed roll CRU

FIG. 11

SYSTEMS AND METHODS FOR A HYBRID DIAGNOSTIC APPROACH OF REAL TIME DIAGNOSIS OF ELECTRONIC SYSTEMS

This nonprovisional application claims the benefit of U.S. Provisional Application No. 60/154,016, filed Sep. 15, 1999, incorporated herein by reference in its entirety.

BACKGROUND OF THE INVENTION

1. Field of Invention

This invention relates to diagnosing systems. In particular, this invention relates to systems and methods for diagnosing systems using a hybrid diagnostics technique.

2. Description of Related Art

Current electronic systems, such as printers and photocopiers, run until a failure occurs. Upon occurrence of one or more failures in the machine, a dedicated sensor in the machine will display an error message on, for example, a user interface indicating a monitored component has failed. This error message contains general information pertaining to the failed monitored component. Based on the content of this error message, a user can either attempt to perform a repair themselves or contact, for example, a customer service engineer to initiate a service call on the machine.

SUMMARY OF THE INVENTION

The above systems work well for sensed components. However, the above systems are incapable of determining which component has failed if the failed component is not a monitored component. Additionally, the above systems recognize failures after they occur and are not capable of dynamically diagnosing failures, or potential failures, in real time. Accordingly, service time is increased, service costs increased and machine down-time increased, all of which lead to customer dissatisfaction.

This invention provides systems and methods that use a combination of qualitative model based reasoning and quantitative analysis techniques in a hybrid diagnostic scheme for diagnosing and/or predicting the status of one or more components in electronic system(s). The quantitative schemes are based on analysis of machine data received from, for example, traditional monitoring devices. This hybrid diagnostic scheme allows for diagnosis and prediction down to the individual component level, with little or no additional sensors beyond those required for normal operation of the machine. This hybrid technology allows an electronic system the ability to self-diagnose itself, for example, in operation as customer jobs are being run, in an effort to, for example, reduce service costs, increase machine up-time and improve customer satisfaction. Alternatively, the systems and methods of this invention can be used at any stage of the manufacturing process or life of the machine to aid in diagnosing failures down to, for example, the individual component level, which may or may not be a directly monitored component.

The systems and methods of this invention combine a qualitative discrete event systems diagnostic methodology in conjunction with quantitative analysis methodologies to achieve a hybrid diagnostic scheme that can perform real-time failure diagnosis and prediction.

This invention separately provides systems and methods that use a combination of qualitative model based reasoning and quantitative analysis in a hybrid diagnostic scheme to diagnose document processing systems such as printers, photocopiers, scanners, facsimile machines, or the like.

The diagnostic systems and methods of this invention enable the design and production of intelligent self-diagnosing machines. Specifically, the diagnostic systems and methods of this invention monitor and track signal changes in one or more machine components. This monitoring can occur in real-time or at some other predetermined or user selected interval. The monitoring may also occur in the normal operational mode of the device or, in a special diagnostic mode.

The systems and methods of this invention utilize a diagnosis methodology that monitors the operation of one or more systems by looking at "events" occurring in a system, such as, for example, commands, control signals, sensor readings, high to low signal transitions, test results, fault flags, counters, parameter changes, and the like. Based on the occurrence of these events, the diagnosis system can generate estimates of the state of the system, and from the state estimates infer the current operational status of the system, such as a fault.

Since the diagnostics systems and methods of this invention are based on a hybrid approach to diagnosis, the diagnostics system are capable of coping with multiple sources of diagnostic information and assessing the state of the machine based on one or more monitored signal changes and additional information, derived from, for example, one or more virtual sensors. Thus, the diagnostic system is not limited to the number of sensors and/or virtual sensor inputs. The use of virtual sensors in the systems and methods of this invention supplement machine sensors and aid in enabling unique component level diagnosis of a machine while reducing or eliminating the need for installation of additional sensors.

Thus, the diagnosis system is capable of dynamic tracking of one or more systems and the ability to reason with multiple sources of information, such as sensors, virtual sensors and indicators. Furthermore, the diagnostic system is capable of identifying a machine's status, for example, a failure, a suspected failure, or a predicted failure at least down to the failed component, such as a field replaceable unit or a customer replaceable unit.

In particular, at least one of a system controller, system sensor and virtual sensor forward information from one or more systems, or, additionally, sub-systems, to an event generator. The event generator compiles the information from the one or more systems, controllers sensors, and/or virtual sensors, and generates an "event" based on the received information. This "event" is then forwarded to a diagnosis system. The diagnosis system, analyzing the events, can then estimate the state of the system, for example, based on a finite state machine model of the one or more components in the system, a constraint based model of the system, a rule based system, or the like. The estimated state, which reflects the status of the system, such as, for example, normal status, a failure mode, or predicted failure mode, can then be output to one or more output devices. Furthermore, information pertaining to the system status can be forwarded to at least one or more of a user, a system operator, service and customer support entities, an autonomous repair agent, a collocated or remote destination, or a distributed network, such as that described in co-pending Attorney Docket No. 103244, incorporated herein by reference in its entirety.

Thus, the hybrid diagnosis systems and methods of this invention are capable of providing a "front-end" to, for example, a diagnostic server, which can in turn determine an appropriate action for the transmission of specific data types directly or indirectly to one or more of a customer, autonomous repair agent, service provider and/or part/consumable supplier, and/or notify the appropriate assistance, repair, parts and/or suppliers to provide the system(s) which is predicted to fail, or has failed, the appropriate information or parts to repair or service the machine.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 8 illustrates an exemplary output of the event generator system for the exemplary system in FIG. 6;

FIG. 9 illustrates an exemplary work flow diagram for the design of the classifier for the exemplary system shown in FIG. 6;

FIG. 10 illustrates an exemplary work flow diagram of the operation of the classifier for the exemplary system shown in FIG. 6;

FIG. 11 illustrates part of an exemplary diagnostic system for the exemplary system in FIG. 6.

DETAILED DESCRIPTION OF PREFERRED EMBODIMENTS

The systems and methods of this invention, through use of a hybrid diagnostic methodology, are capable of acquiring and processing the necessary data to determine the operational status of one or more components in a machine, such as a printer, photocopier, or any other system for which the acquisition of status data pertaining to the system is required. Therefore, the systems and methods of this invention are capable of providing a "front-end" that allows the acquisition, processing and routing of a variety of status data types between a plurality of end-users, service/part suppliers and/or one or more diagnostic servers and secondary information resources to effectively predict, diagnose, repair, schedule, and/or ship service and/or parts to the one or more systems being monitored.

Figure 1:
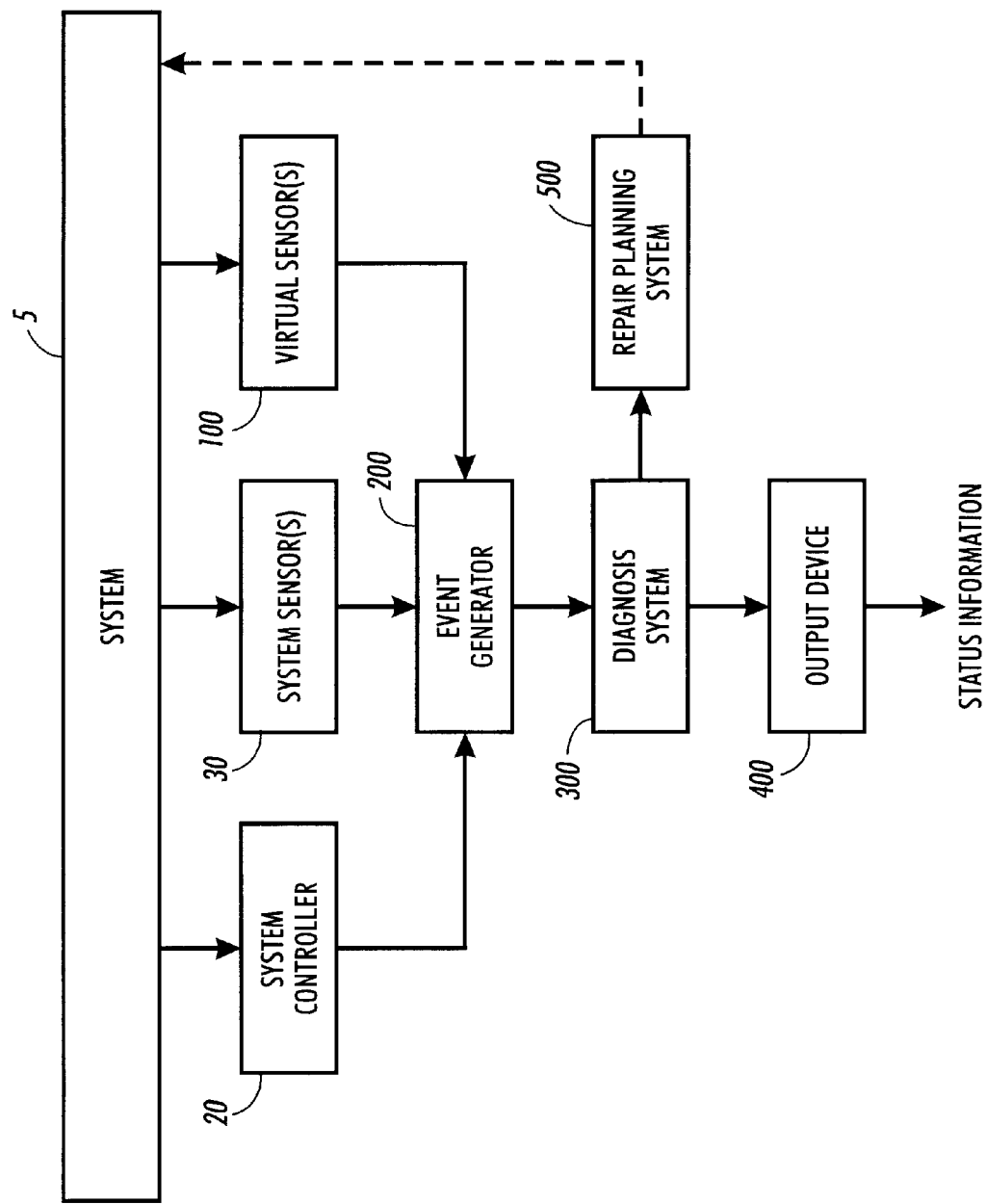
FIG. 1 is a functional block diagram showing a first embodiment of the diagnostic system according to this invention.

FIG. 1 illustrates a systems overview of the hybrid diagnostic system 1 according to this invention. In this exemplary embodiment, the system 5 which is being monitored, is separate from the diagnostic system. However, it is to be appreciated that the various components described in conjunction with the systems and methods of this invention can be located anywhere, including within the actual device or system being monitored, on a dedicated diagnostic device which is connected to the system 5, via, for example, one or more wired or wireless links, such as a network, the Internet, an intranet, or any other known or later developed link that is capable of transferring information between the connected components, or any combination thereof. The hybrid diagnostic system 1 comprises a system controller 20, one or more system sensors 30, one or more virtual sensors 100, an event generator 200, a diagnostic system 300 and an output device 400.

The system controller 20, the system sensors 30 and/or the virtual sensors 100 collect and forward information pertaining to the status of the system 5 to the event generator 200. Specifically, the system controller 200 forwards data such as commands issued by, for example, system and subsystem controllers, not shown, actuator signals, set-point signals, scheduling and timing data, job information, machine operational mode, or the like, to the event generator 200. The control commands may be issued as part of a real-time operation of the system, or may be special commands issued in a specific test mode or diagnostic mode. Additionally, the system sensors 30 forward data, including control data such as signal changes in response to control commands and/or test commands, process control data, or the like, monitoring data, such as outputs of special diagnostic sensors and counters, signal changes in response to failures, wear information, fault information, status information, or the like, and environmental/operational condition data such as temperature information, humidity information, or the like, to the event generator 200. The sensor signals may be analog or digital, and may be generated as part of the normal operation of the system, or may be in response to special commands issued in specific test modes or diagnostic modes.

The virtual sensor(s) 100 provide diagnostic information to the event generator by analytical means, i.e., by a quantitative and/or a qualitative processing of actual system information. The virtual sensors supplement the information provided by the one or more of the system controller 20 and the system sensor 30. In particular, the one or more virtual sensors 100 aid in refining the diagnosis that can be performed using the data obtained from the system controller 20 and the system sensor 30, to, for example, provide fault isolation to particular components within the system 5, that may or may not be directly monitored. In other words, the virtual sensors "fill in the gaps" to supplement the information provided by the "hardwired" system sensors. A variety of different choices are available for the virtual sensor 100. The simplest example of a virtual sensor 100 is a counter. For example, counters are very frequently used in print engines for diagnostic purposes. Alternatively, the virtual sensor can be based on a threshold analysis design. For threshold analysis, a signal from the system 5 is compared against a predetermined value to determine if the value has exceeded an upper or lower limit. This comparative information can then be analyzed to provide useful diagnostic information pertaining to the state of the system 5. Alternatively, the virtual sensor 100 can be based on a signature analysis model. Here, any relevant system signals and/or data, such as a ground current, a sensor signal, an actuator signal, or the like, is subject to signature analysis so that the features containing useful diagnostic information can be extracted. Additionally, the virtual sensor technology 100 can be based on a statistical analysis of the data obtained from the system 5. For example, mean and variance analysis, statistical estimates, and the like are often useful diagnostic indicators. Alternatively, the virtual sensor may be based on trend analysis, timing analysis, and rate analysis. Alternatively, the virtual sensor may be a based on computational techniques such as linear algebra, differential calculus, qualitative calculus, logical equations, topological analysis, and the like.

Finally, the virtual sensor 100 can be based on image quality analysis techniques such as those described in co-pending Attorney Docket Nos. 103059, 104707, 104708, 104709, 104710, 104759 and 104728, all of which are incorporated herein by reference in their entirety. In this instance, the output image from, for example, a printer or photocopier, is subjected to image quality analysis and/or defect recognition analysis. The resulting metrics from this analysis can then be forwarded to the event generator 200 to aid in determining the system 5 status. As with the sensor signals, the virtual sensor signals may be generated as part of the normal operation of the system, or may be in response to special commands issued in specific test modes or diagnostic modes.

The event generator 200 acquires and analyzes the one or more types of data arriving from the system controller 20, the system sensor 30 and the virtual sensor 100. The event generator 200 is capable of operating continuously, or for predetermined time sequences, to collect, and optionally store data obtained from the various sensors, virtual sensors, and/or controllers. The event generator translates this data into a format recognizable by the diagnostic system 300. For example, this translation may involve discretization of the analog data received from the one or more sensors to qualitative values. Alternatively, this translation may involve translating machine signals into discrete event sequences for example, by detecting specific signal transitions such as a transition from a high to low, on to off, or the like.

Alternatively, the event generator may forward the results of specific system tests, such as appropriately formatted pass or fail values to the diagnosis system 300. Finally, the event generator 200 may translate the results of virtual sensor analysis into a qualitative format for the diagnosis system 300. The data forwarded by the event generator may be un-timed, or time-stamped data depending on the nature and the requirements of the diagnostic system 300. Thus, the event generator 200 translates the data from one or more of the sensors, virtual sensors, and controllers into discrete events that corresponding to the operation of the system 5. In order to forward these events in the appropriate sequence to the diagnosis system, the signal transitions of interest, for example, the various commands and sensor changes, and their order of occurrence, the test sequences, and the ordering of the virtual sensor outputs are predefined in, for example, a table which is referenced upon the inception of a diagnostic run. This table, for example, contains a list of "events" that are recognized by the diagnosis system 300.

The diagnostic system 300 then analyzes the discrete events determined by the event generator 200 and estimates a state of the system 5 based on these events. This estimated state reflects the status of the system, such as, for example, normal status, a failure mode or a predicted failure mode. The diagnostic system is based on qualitative reasoning schemes such as model based reasoning, discrete event systems diagnostic technology, constraint programming, bayesian networks, causal networks, neural networks, expert systems, and the like. In particular, the discrete event systems based diagnostic engine can be designed and built as discussed in "Diagnosibility of Discrete Event System," IEEE, 1995, and "Failure Diagnosis Using Discrete Event Models," IEEE, 1996, both by M. Sampath et. al., incorporated herein by reference in their entirety. The output of the diagnostic system, for example, the failure mode, can then be output to an output device 400, such as a user interface, a collocated or remote monitoring site or user interface, a service technician, a parts supplier, a web page, an e-mail address, or the like. Alternatively, or in addition, the output of the diagnostic system may be passed on to a repair planning module 500 which decides the appropriate repair action corresponding to the failure. The repair action may be one or more, or a combination of, customer repair, placement of a service call, and/or autonomous repair carried out by, for example, an autonomous repair agent. The output of the repair planning module 500 may, for instance, be a "Replace Part" message to the customer, or it may involve running an automated set-up procedure. Once the repair action is determined, the output of the repair planning system is routed to the appropriate recipient as described in Attorney Docket No. 103244.

Figure 2:
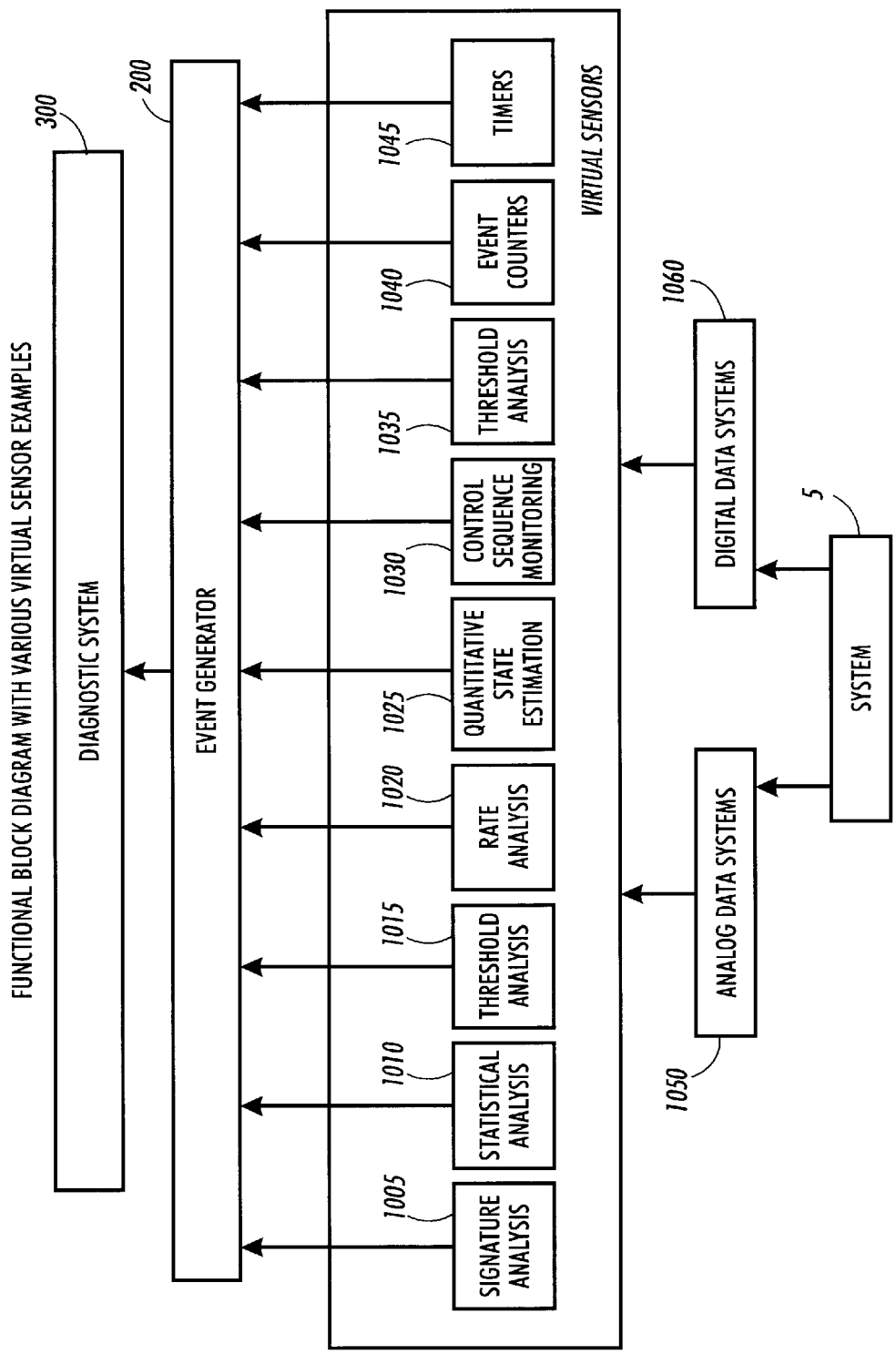
FIG. 2 illustrates a functional block diagram showing a second embodiment of the diagnostic system according to this invention.

FIG. 2 illustrates a block diagram of a hybrid diagnostic system with a number of specific examples of virtual sensor technologies. Specifically, the hybrid diagnostic system comprises the diagnostic system 300, the event generator 200, one or more virtual sensors 100, the system 5, and one or more sets of data streams from the system 5 to the virtual sensors 100, such as analog data stream 1050 and digital data stream 1060. The virtual sensors 100 can be one or more, or a combination of, a signature analysis module 1005, a statistical analysis module 1010, a threshold analysis module 1015, a rate analysis module 1020, a quantitative state estimator module 1025, a control sequence monitoring module 1030, a threshold analysis module 1035, an event counter module 1040 and a timer module 1045.

The signature analysis module 1005 analyzes signals received from the analog signal stream 1050 and can, for example, compare sensed signals to stored signal signatures, or compute predetermined parameters of the signal. The signature analysis may take place either on the raw signals received from the analog stream 1050, or, for example, a set of pre-determined feature variables extracted from the raw signals. The statistical analysis module 1010 receives one or more analog signals from the analog data stream 1050 and determines, based on a statistical analysis, characteristics of the data stream(s) such as means, variances, whiteness measures, or the like. The threshold analysis module 1015 derives status information based on a comparison of received data to threshold values. The rate analysis sensor 1020 monitors the rate of change, such as an increase/decrease of the value of one or more system variables. The quantitative state estimation module 1025 can be based on, for example, the analytical redundancy based schemes such as Luenberger observers, robust observers, Kalman filters, fault detection filters, parity space approaches, parameter estimation techniques, or the like. The control sequence monitor sensor 1030 monitors system control commands, and determines, for example, out of sequence commands, or missing commands. The threshold analysis sensor 1035 derives status information based on a comparison of received data to threshold values. The event counter sensor 1040 counts system events and the timer sensor 1045 monitors and analyses the timing of events in the system 5.

Figure 3:
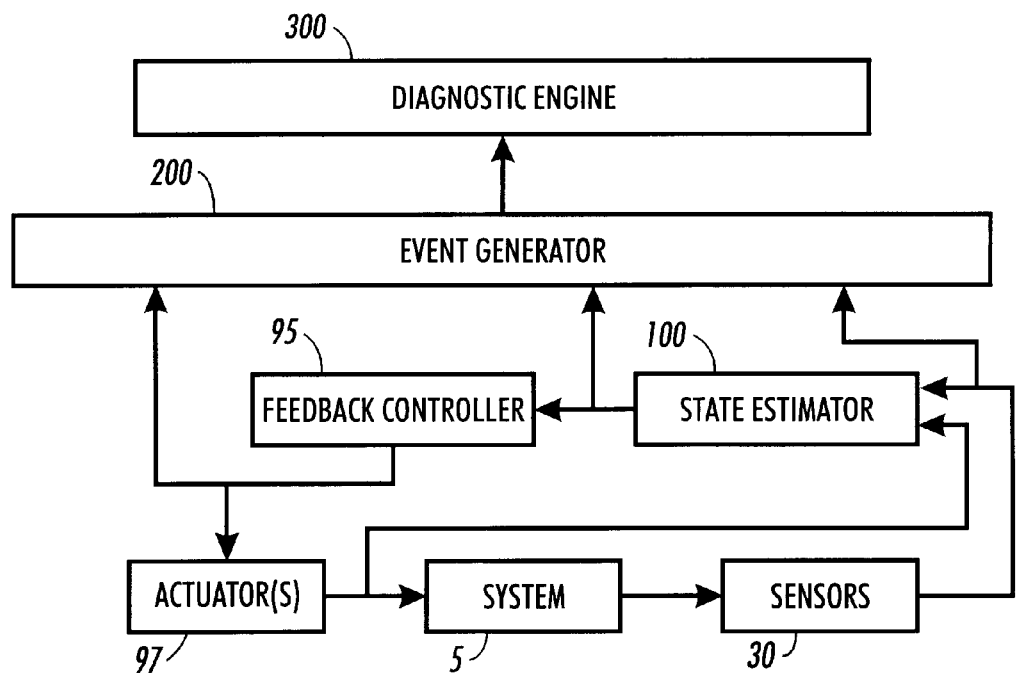
FIG. 3 illustrates a functional block diagram showing a third embodiment of the diagnostic system according to this invention.

FIG. 3 shows another example of a diagnostic system according to this invention. This illustrative embodiment comprises the system 5, one or more sensors system sensors 30, a virtual sensor, here a state estimator 100, a feedback controller 95 the event generator 200 and the diagnostic engine 300. In particular, this embodiment illustrates the interaction of a closed loop control system with statistical state estimation based virtual sensors, such as for example, Kalman filters.

Figure 4:
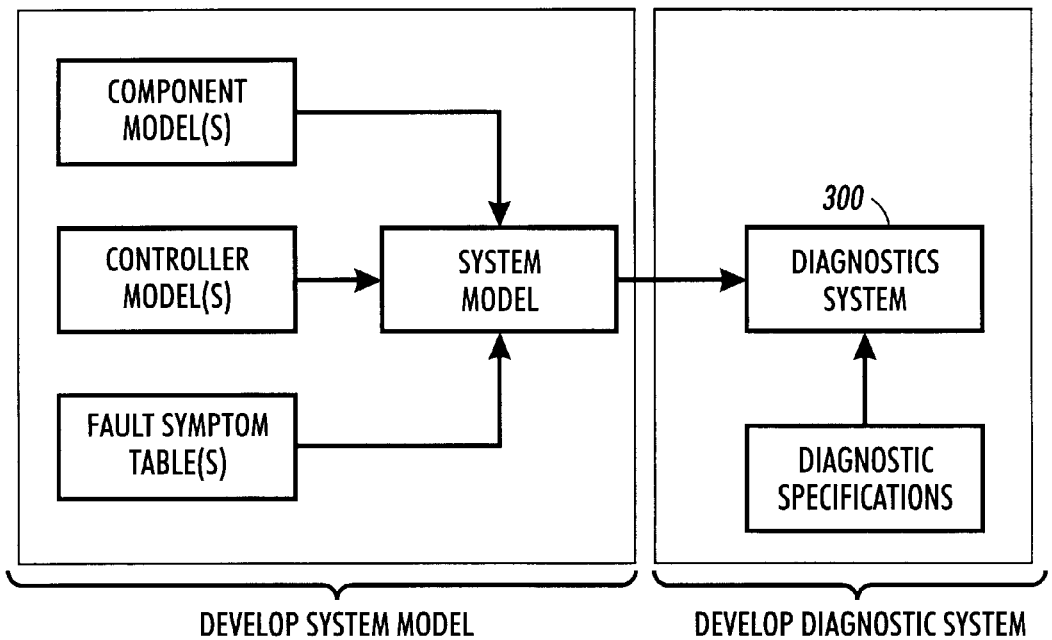
FIG. 4 illustrates an exemplary work flow diagram for developing a diagnostic system according to this invention.

FIG. 4 is an exemplary flow diagram illustrating the development of the system models and diagnostic system according to this invention. Specifically, component models, controller models and one or more fault symptom tables are compiled to generate a system model. The component models capture both normal and failure modes of the system components. The controller module captures the various sequences of control commands that are issued as part of the normal operation of the system, or, alternatively, during a special testing or a diagnostic mode of operation. It is noted that the controller model is optional and it may not be necessary to explicitly model the controller, depending on the design and the implementation of the diagnostic system. The fault symptom table lists the outputs of the sensors and virtual sensors used by the diagnostic system for the various failure modes as well as the normal mode of operation of the system. This system model is then used, along with a listing of diagnostic requirements, to generate the diagnostic inference engine. The diagnostic requirements specify the resolution with which failures are to be diagnosed, such as for example, if each failure is to be uniquely diagnosed, or if it sufficient to determine if one of a class of failures has occurred. In particular, in the case of the discrete event systems diagnostic approach, the generation of the system model and the diagnostic engine are done according to the algorithms discussed in "Diagnosibility of Discrete Event System," IEEE, 1995, and "Failure Diagnosis Using Discrete Event Models," IEEE, 1996, both by M. Sampath, et. al., and incorporated herein by reference in their entirety. It is also noted that the diagnostic engine may be directly synthesized from the component models, the controller model and the fault symptom tables, without the intermediate phase of generating the system model.

FIGS. 5–11 illustrate how the systems according to this invention work in an exemplary simple electronic system. Specifically, the exemplary electronic system is a printer, or, a photocopier, and the subsystem that is diagnosed is a paper feed assembly in the printer or photocopier.

Figure 5:
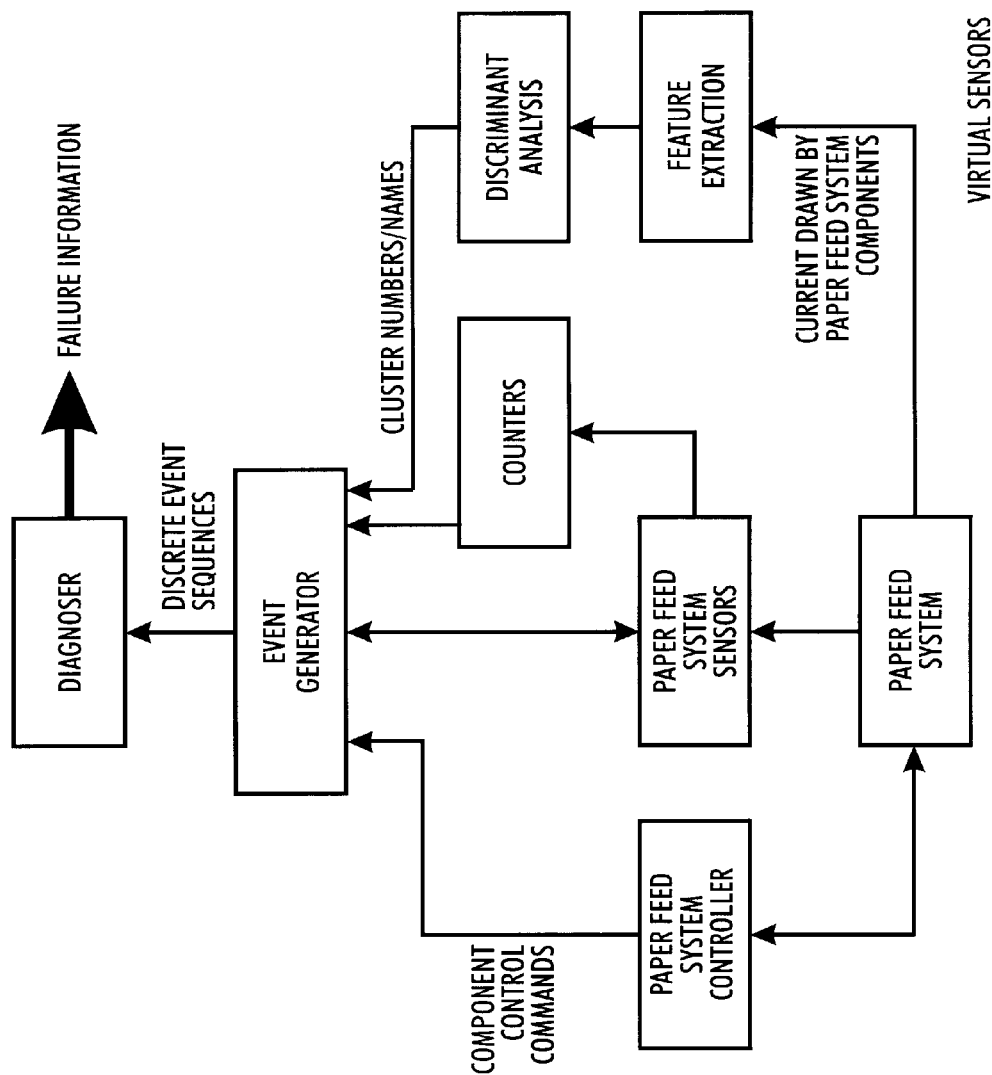
FIG. 5 illustrates an exemplary monitored system according to this invention.

In particular, FIG. 5 illustrates an exemplary functional block diagram of the paper feed system having an embedded diagnostic system. In this case, the control commands issued by the system controller are the commands to turn a feed motor that drives the various paper feed system components, an elevator motor that raises the stack of paper in the paper tray, and an acquisition solenoid that controls the feeding of paper, on and off. The sensors in the system are a wait station sensor, that detects the arrival of the paper, and a stack height sensor that checks the height of the paper in the paper trays. Two kinds are virtual sensors are used in this system. One, a feature extraction and discriminant analysis based virtual sensor, and two, a set of counter sensors. One counter keeps track of the stack height sensor readings over consecutive paper feeds and the other counter keeps track of the number of sheets fed. The failures diagnosed include stalled motors, broken and degraded solenoids, damaged feed rolls, and out-of-paper situations.

Figure 6:
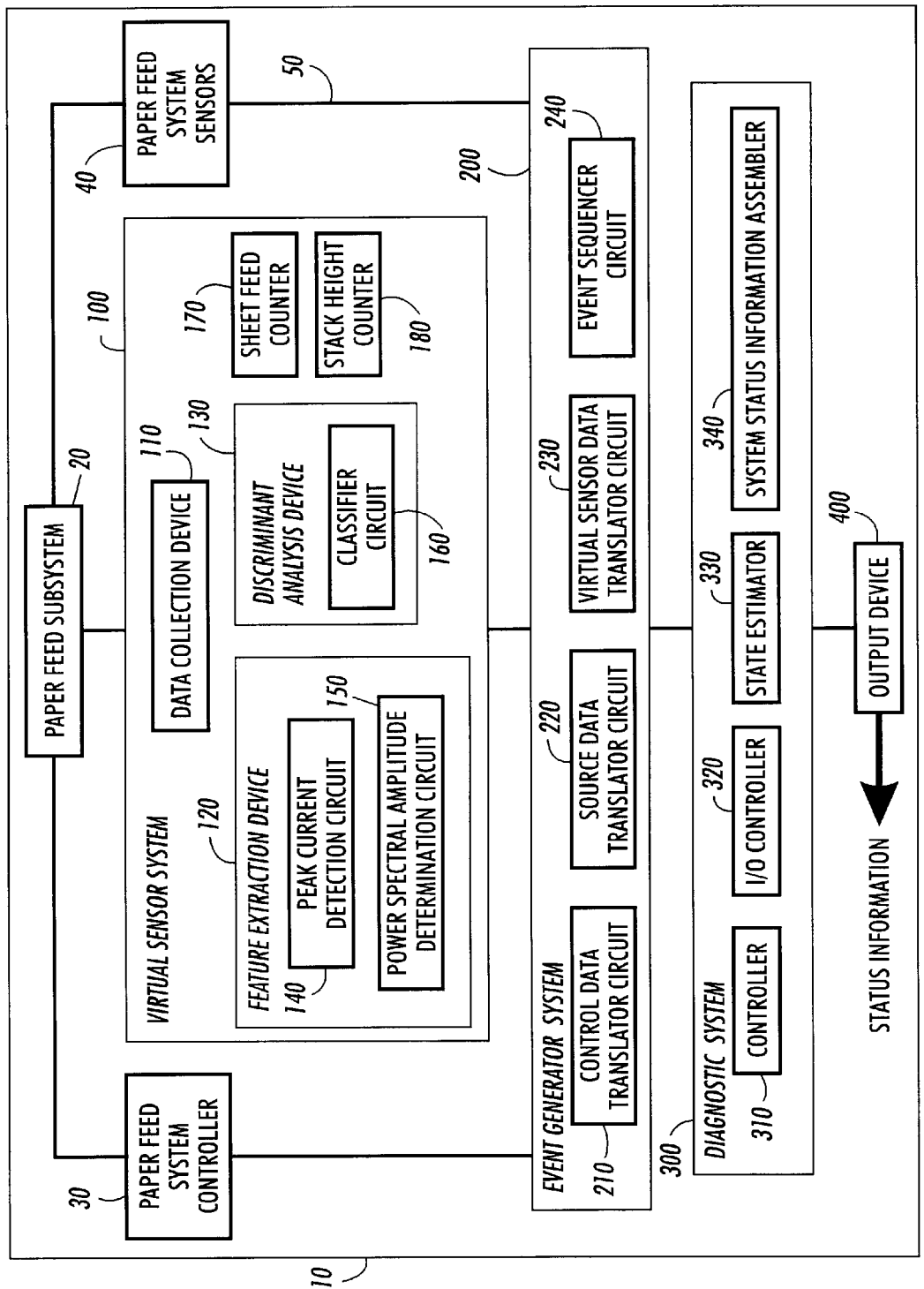
FIG. 6 illustrates a detailed functional block diagram of the exemplary monitored system in FIG. 5.

FIG. 6 illustrates in greater detail, the diagnostic system of FIG. 5. As discussed previously in relation to FIG. 5, the printing system 10 includes a paper feeder subsystem 20, a paper feeder system controller 30, and paper feeder system sensors 40. Additionally, the diagnostics portion of the system 10 comprises a virtual sensor system 100, an event generator system 200, a diagnostics system 300 and an output device 400, all interconnected by links 50.

The links 50 can be a wired or wireless link or any other known or later developed element(s) that is capable of supplying electronic data to and from the connected elements.

The virtual sensor system 100 comprises a data collection device 110, a feature extraction device 120, a discriminate analysis device 130, a peak current detection circuit 140, a power spectral amplitude determination circuit 150, a classifier circuit 160, a sheet feed counter 170 and a stack height sensor counter 180.

The event generator system 200 comprises a control data translator circuit 210, a sensor data translator circuit 220, a virtual sensor translator circuit 230 and an event sequencer circuit 240. The diagnosis system 300 comprises a controller 310, an I/O controller 320, a state estimator 330, and a system status information assembler 340.

As previously discussed, information from the paper feed system controllers 30, the paper feed system sensors 40, and virtual sensors 100 is forwarded to the event generator system 200. Thus, information from which "events" can be directly correlated is forwarded directly to the event generator system 200.

Information from the sensors 40, and additionally the ground return current, which is an aggregate of the current drawn by all of the paper feed system components is forwarded to the virtual sensor device 100, in order to generate additional system "events" that may or may not be directly detectable by the system controller and sensors. The data collection device 110 tracks and stores this information. With the acquired data, and for a more advanced determination of system status, the sheet feed counter 170, the stack height sensor counter 180, the feature extraction device 120 and the discriminant analysis device 130 are used to extract information pertaining to the system status that is not readily available from one or more of the system controller 20 and the system sensor 30. The stack height counter 180 keeps track of the stack height sensor readings over consecutive paper feeds and the sheet feed counter 170 keeps track of the number of sheets fed by monitoring a wait station sensor over consecutive feeds.

Illustratively, the feature extraction device 110 comprises the peak current detection circuit 130 and the power spectral amplitude determination circuit 140. However, it is to be appreciated that alternative features such as power spectral frequencies, results of vibration signal analysis, time-frequency signals, and the like, can be used in place of or in conjunction with the peak current detection circuit 130 and the power spectral amplitude determination circuit 140 without affecting the operation of the virtual sensor system 100. In this illustrative example, the peak current detection circuit 140 monitors and stores, for example, the peak current drawn by the paper feed system components. Additionally, the power spectral amplitude determination circuit 150 monitors and assembles the power spectral amplitudes of the ground current drawn by the paper feed system components. Once the desired feature(s) are extracted, the features are passed to the discriminant analysis device 130.

As discussed above, the peak current and power spectral amplitude are chosen, by way of illustration, due to the ease of computing these features, and the ease of mapping the features to the corresponding failure modes of the system. However, any such mapping must account for the statistical variations in the feature values that occur during operation of the system. Therefore, it is preferable that multivariate discriminate analysis be performed in the discriminate analysis device 130. A discussion of multivariate analysis can be found in "An Introduction to Multivariate Statistical Analysis," Second Edition, by T. W. Anderson, 1984, and "Multivariate Statistical Methods" by D. Morrison, 1976, each of which are incorporated herein by reference in their entirety.

The discriminant analysis device 120 typically comprises a classifier circuit. In this illustrative example, the classifier is chosen to be a quadratic classifier 160. However, the discriminant analysis device may be based on any of the known multivariate analysis techniques. Specifically, a number of alternative algorithms exist for the design of the classifier, that differ in the classification algorithm, and can be also used in conjunction with the systems and methods of this invention without affecting its operational characteristics. For example, see "Pattern Classification and Scene Analysis" by R. Duda, 1973, incorporated herein by reference in its entirety, and also "An Introduction to Multivariate Statistical Analysis," and "Multivariate Statistical Methods", cited above. Examples include but are not limited to linear classifiers, logistic regression, principal component analysis, Bayes classifiers and the like.

The quadratic classifier 160 operates based on classifier parameters, which include, for example, the total number of clusters, their corresponding identification numbers, the means and covariance matrices of the clusters and a parametric constant for each cluster. In general, the discriminant analysis device 130 analyzes the data assembled by the feature extraction device 120, and classifies the set of features into any one of the given clusters, based on the distance of the given sample set of features, from the region, or cluster, formed by each group in the multi-dimensional space spanned by the feature variables. The sample point is then classified into the cluster with the closest proximity. In the case of the virtual sensor system 100, the clusters correspond to the different status, e.g., failure, modes. The cluster name or number is the output of the virtual sensor system 100. This cluster is then translated into an "event" by the event generator system 200.

The event generator system 200 translates the various information received from system sensors, controllers, and virtual sensors and converts this information into discrete events, or occurrences, that can be recognized by the diagnosis system 300. In particular, the control data translator circuit 210 receives data from one or more of the system controllers, the sensor data translator circuit 220 receives data from the one or more system sensors 30 and the virtual sensor data translator circuit 230 receives data from the one or more virtual sensors such as 100. The event generator system 100 compares this information to, for example, a look-up table for translation of the data into "discrete event" data. The event sequencer circuit 240 sequences the various events and passes them in the right order to the diagnostic system 300.

The diagnosis system 300 interprets the discrete events forwarded from the event generator system 200 to generate a corresponding machine status information. The diagnosis system is based on qualitative models of the system, where the qualitative information is provided via the "events." The diagnosis system is based on one or more of a number of different technologies such as discrete event systems diagnostic technology, model based reasoning , bayesian inferencing, constraint based programming, neural networks, and causal networks. Typically, two approaches may be followed for the design and implementation of the diagnostic system 300. In the first approach, one or more of component models, controller models and fault system tables are used, in conjunction with diagnostic requirements, to generate a diagnostic inference engine, which is then stored in the memory of the diagnostic system 300, such as, for example, a look-up table, or a rule based system. At the time of the actual diagnosis, the inferencing is simply done by updating the state of the inference engine based on "events" generated by the event generator system 200. Alternately, either the complete system model, or the component models and the fault symptom tables, may be stored in the memory of the diagnostic system 300, and the diagnostic computation performed on-line as "events" are received from the event generator system 200. In other words, the diagnostic inference engine may be incrementally generated during the diagnostic process.

The status information output from the diagnosis system can indicate, for example, if the machine is operating normally, i.e., there is no fault, or, if certain failures have occurred, or if some failures are suspected to have occurred, or if failures are predicted to occur. Having determined the current state of the system, the system status information assembler 340 assembles an appropriate message, which is transferred via link 50, to the output device 400.

The output device 400 can be a local output display module, such as a user interface, for displaying the status information or failure information output by the diagnosis system 300. The output device 400, for example, can be a user interface that displays a high level status indicator and a failure list. The high level indicator, which can be appropriately colored, or aurally enhanced, specifies the current machine status. For example, the status may be normal, suspected failure, or determined failure. The failure list displays the failures, both suspected and certain, in, for example, separate categories on a user interface. Alternately, the output device 400 may be a remote display module with the recipients of the diagnostic information and the communication channels as described in Attorney Docket No. 103244.

Figure 7:
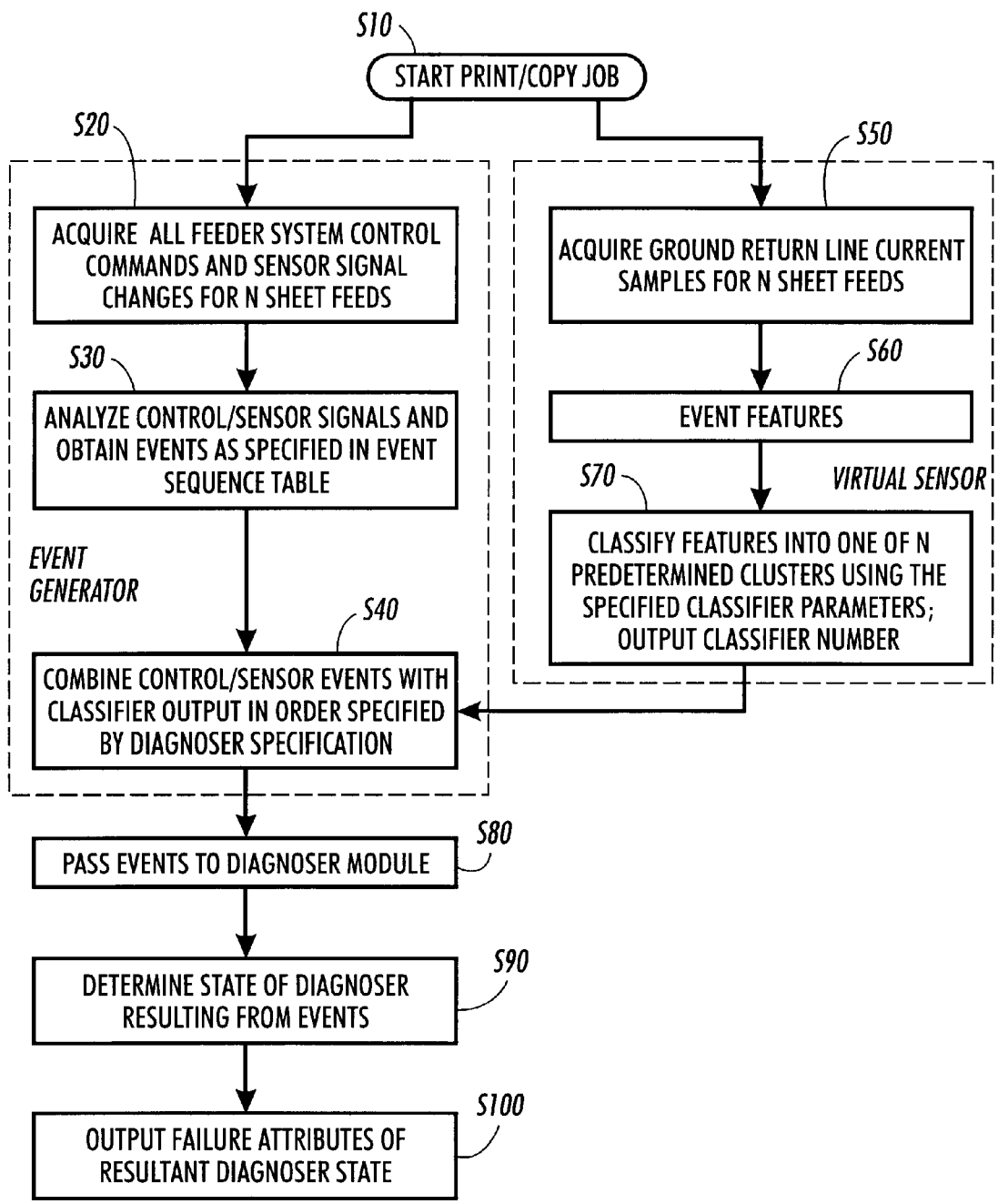
FIG. 7 illustrates an exemplary work flow diagram for the exemplary monitored system shown in FIG. 6.

FIG. 7 illustrates an exemplary flow diagram associated with the system in FIG. 6. Control begins in step S10 where the print and/or copy job is commenced. Next, in step S20, the feeder system control commands and sensor signal changes are acquired. Additionally, in step S50, the ground return line current samples are acquired. Then, in step S30, the control and/or sensor signals are analyzed to obtain events such as those specified in the exemplary event generator system output, in exemplary FIG. 8. Meanwhile, in step S60, the virtual sensor illustratively extracts peak current and power spectral amplitude features, from the ground return line current samples. Then, in step S70, the extracted features are classified into one of a predetermined number of clusters using, for example, the specified classifier parameters and output classifier numbers.

In step S40, the event generator combines the control and/or sensor events with the classifier output in an order specified by the diagnostics system specification. These events are then passed to the diagnosis system in step S80. Next, in step S90, the state of the system is determined by the diagnosis system based on the events. Then, in step S100, the status information, or failures, determined by the diagnosis system are output.

FIG. 8 illustrates an exemplary output of the event generator system for the exemplary paper feeder assembly. In particular, the event generator table comprises event numbers and/or event names that are forwarded to the diagnosis system 300 for estimating the state of the paper feeder system. Once the state of the machine is determined by the state estimator 360, as previously discussed, the system status information assembler 340 forwards the appropriate status information to the output device 400 or to the repair planning module 500.

FIGS. 9 and 10 illustrate exemplary operations of the quadratic classifier circuit 160. For example, in the case of the exemplary paper feed system, in FIG. 9, in an off-line design phase of the classifier, for each cluster or group, i.e., the normal mode and each failure mode, a number of sheet feeds on the printer and/or copier are run and features pertaining to these sheet feeds acquired. Then, for a chosen class of classifier structure, i.e., quadratic, linear, or the like, the classifier parameters are determined using statistical tools.

FIG. 10 illustrates how a cluster is determined, during the on-line operation of a classifier, once the off-line design, or, training phase is completed. In particular, the distance of the feature vectors from each cluster is computed using the classifier parameters computed in the off-line design phase. Then, the closest cluster is output to the event generator system 200.

FIG. 11 illustrates a part of an exemplary diagnostic system for the exemplary system of FIG. 6. The diagnostic system, in this example, is shown as a rule based system. The diagnostic inference engine is referred to as the diagnoser.

Figure 12:
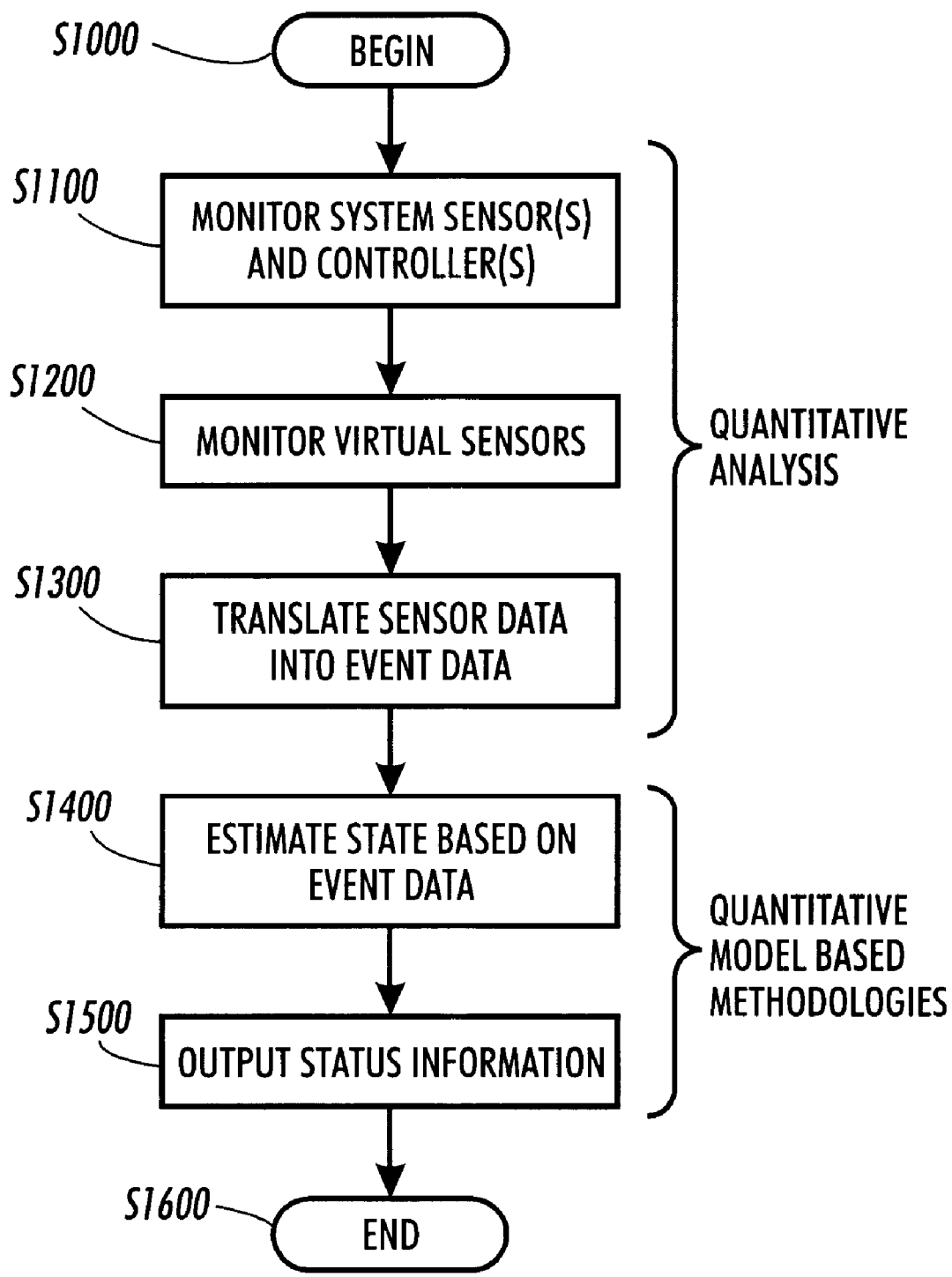
FIG. 12 is a flowchart outlining a first exemplary embodiment of the method for diagnosing systems according to this invention.

FIG. 12 illustrates and exemplary flowchart outlining one exemplary embodiment for diagnosing a system according to this invention. Control begins in step S1000 and continues to step S1100. In step S1100, one or more system sensors/controllers are monitored, and optionally, the data collected from the sensors stored. Next, in step S1200, or in parallel with step S1100, one or more virtual sensors are monitored, and optionally, the data collected from the sensors stored. Then, in step S1300, the collected data is translated into event data based on, for example, event sequence tables. Control then continues to step S1400.

In step S1400, the event data is analyzed to estimate the state of the system. Next, in step S1500, information pertaining to the failure status of the system is output. Control then continues to step S1600 where the control sequence ends.

As shown in FIGS. 1–11, the diagnostic and failure prediction system is preferably implemented either on a single program general purpose computer or separate programmed general purpose computer. However, the diagnostic and failure prediction system can also be implemented on a special purpose computer, a programmed microprocessor or microcontroller and peripheral integrated circuit element(s), an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowcharts and workflow diagrams shown in FIGS. 12 can be used to implement the diagnostic and failure prediction system.

Furthermore, the disclosed method may be readily implemented in software using object or object-oriented software development environments that provide portable source code that can be used on a variety of computer or workstation hardware platforms. Alternatively, the disclosed search system may be implemented partially or fully in hardware using standard logic circuits or a VLSI design. Whether software or hardware is used to implement the systems and methods in accordance with this invention is dependent on the speed and/or efficiency requirements of the system, the particular function, and the particular software or hardware systems or microprocessor or microcomputer systems being utilized. The diagnostic and failure prediction systems and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as a Java® or CGI script, as a resource residing on a server or workstation, as a routine embedded in a dedicated diagnostic and failure prediction system, or the like. The diagnostic and failure prediction system can also be implemented by physically incorporating the system and method into a software and/or hardware system, such as the hardware and software systems of a workstation or dedicated diagnostic system.

It is, therefore, apparent that there has been provided, in accordance with the present invention, systems and methods for diagnosis and failure prediction of electronic systems. While this invention has described in conjunction with preferred embodiments thereof, it is evident that many alternatives, modifications, and variations will be apparent to those skilled in the art. Accordingly, Applicants intend to embrace all such alternatives, modifications and variations that follow in the spirit and scope of this invention.

What is claimed is:

1. A hybrid diagnostic system for status prediction and diagnosis comprising:
   at least one system sensor;
   at least one virtual sensor, wherein the virtual sensor determines status information based on a quantitative analysis of data from a monitored system; and
   a diagnostic inference device that performs a qualitative analysis on the information from at least one of the at least one system sensor and the at least one virtual sensor.

2. The system of claim 1, wherein the at least one virtual sensor is at least one of a signature analysis module, a statistical analysis module, a threshold analysis module, a rate analysis module, a timing analysis module, a quantitative state estimator module, a computational module that is based on at least one of linear algebra, differential calculus, qualitative calculus, logical equations, and topological analysis, a pattern recognition module, an image processing module, a control sequence monitoring module, a threshold analysis module, a counter module and a timer module.

3. The system of claim 2, wherein the quantitative state estimator module is based on at least one of an analytical redundancy based scheme, a Luenberger observer, a robust observer, a Kalman filter, a fault detection filter, a parity space approach and a parameter estimation technique.

4. The system of claim 1, wherein the qualitative analysis is based on at least one of model based reasoning, a discrete event systems diagnostic technology, a constraint based programming methodology, a bayesian network, a causal network, a neural network and an expert system.

5. The system of claim 1, further comprising an event generator device that translates information from one or more of the at least one sensor and the at least one virtual sensor into a format appropriate for the diagnostic inference device.

6. The system of claim 5, wherein an output of the event generator device is based on at least one of a control signal, an actuator and a set-point signal, a scheduling and a timing signal, a job and a machine operational mode information, a sensor response to control commands and test commands, process control data information, monitoring data, wherein the monitoring data is at least one of an output from at least one of a special diagnostic sensor, a counter and a sensor signal change, environmental and operational condition data and a virtual sensor output.

7. The system of claim 5, wherein the translation of the sensor information into event information is based on at least one of tracking and translating machine signals into discrete event sequences, discretization of analog data into qualitative values, transformation of quantitative sensor values into qualitative values, sequencing the monitored system and sensor signals and formatting the event information.

8. The system of claim 1, wherein an output of the diagnostic inference device is forwarded to at least one of a user, a system operator, a service provider, a parts supplier, a repair planning system, an autonomous repair agent, a diagnostic server, and a secondary information resource.

9. A hybrid diagnostic system for prediction and diagnosis of system status in a document processing system comprising:
    a document processing system comprising at least one of at least one system sensor and at least one virtual sensor, wherein the virtual sensor is based on a quantitative analysis of data from one or more components of the document processing system; and
    a diagnostic inference engine based on qualitative analysis of the data from the one or more sensor or virtual sensor.

10. The system of claim 9, wherein the at least one virtual sensor is at least one of a signature analysis module, a statistical analysis module, a threshold analysis module, a rate analysis module, a timing analysis module ,a quantitative state estimator module, a computational module that is based on at least one of linear algebra, differential calculus, qualitative calculus, logical equations, and topological analysis, a pattern recognition module, an image processing module, a control sequence monitoring module, a threshold analysis module, a counter module and a timer module.

11. The system of claim 10, wherein the quantitative state estimator module is based on at least one of an analytical redundancy based scheme, a Luenberger observer, a robust observer, a Kalman filter, a fault detection filter, a parity space approach and a parameter estimation technique.

12. The system of claim 9, wherein the qualitative analysis is based on at least one of model based reasoning, a discrete event systems diagnostic technology, a constraint programming methodology, a bayesian network, a causal network, a neural network and an expert system.

13. The system of claim 9, further comprising an event generator device that translates data from one or more of the at least one sensor and the at least one virtual sensor into a format appropriate for the diagnostic inference device.

14. The system of claim 13, wherein an output of the event generator device is based on at least one of a control signal, an actuator and a set-point signal, a scheduling and a timing signal, a job and a machine operational mode information, a sensor response to control commands and test commands, process control data information, monitoring data, wherein the monitoring data is at least one of an output from at least one of a special diagnostic sensor, a counter and a sensor signal change, environmental and operational condition data and a virtual sensor output.

15. The system of claim 13, wherein the translation of the sensor information into event information is based on at least one of tracking and translating machine signals into discrete event sequences, discretization of analog data into qualitative values, transformation of quantitative sensor values into qualitative values, sequencing the monitored system and sensor signals and formatting the event information.

16. The system of claim 9, wherein an output of the diagnostic inference device is forwarded to at least one of a user, a system operator, a service provider, a parts supplier, a repair planning system, an autonomous repair agent, a diagnostic server, and a secondary information resource.

17. A method for diagnosing or predicting failures in an electronic system comprising:
    monitoring one or more system sensors and virtual sensors to capture sensor information;
    translating the sensor information into event information; and
    estimating a state of the system based on the event information.

18. The method of claim 17, wherein the at least one virtual sensor is at least one of a signature analysis module, a statistical analysis module, a threshold analysis module, a rate analysis module, a timing analysis module, a quantitative state estimator module, a computational module that is based on at least one of linear algebra, differential calculus, qualitative calculus, logical equations, and topological analysis, a pattern recognition module, an image processing module, a control sequence monitoring module, a threshold analysis module, a counter module and a timer module.

19. The method of claim 18, wherein the quantitative state estimator module is based on at least one of an analytical redundancy based scheme, a Luenberger observer, a robust observer, a Kalman filter, a fault detection filter, a parity space approach and a parameter estimation technique.

20. The method of claim 17, wherein the state is estimated based on at least one of model based reasoning, a discrete event systems diagnostic technology, a constraint programming methodology, a bayesian network, a causal network, a neural network and a expert system.

21. The method of claim 17, wherein the event information is based on at least one of a control signal, an actuator and a set-point signal, a scheduling and a timing signal, a job and a machine operational mode information, a sensor response to control commands and test commands, process control data information, monitoring data, wherein the monitoring data is at least one of an output from at least one of a special diagnostic sensor, a counter and a sensor signal change, environmental and operational condition data and a virtual sensor output.

22. The method of claim 17, wherein the diagnosis and/or prediction can be performed during at least one of a normal operation of the electronic system, a diagnostic mode and a test mode.

23. The method of claim 17, wherein the translation of the sensor information into event information is based on at least one of tracking and translating machine signals into discrete event sequences, discretization of analog data into qualitative values, transformation of quantitative sensor values into qualitative values, sequencing the machine and sensor signals and formatting the event information.

24. An information storage medium having information that diagnoses or predicts failures in an electronic system comprising:

information that acquires information about the system using at least one system sensor;

information that performs a quantitative analysis on a portion of the information about the system using at least one virtual sensor;

information that performs a qualitative analysis on a portion of the information about the system; and information that diagnoses a status of the system based on the combined results of the quantitative and the qualitative analysis.

25. The information storage medium of claim 24, wherein the quantitative information is derived from at least one of a signature analysis module, a statistical analysis module, a threshold analysis module, a rate analysis module, a timing analysis module, a quantitative state estimator module, a computational module that is based on at least one of linear algebra, differential calculus, qualitative calculus, logical equations, and topological analysis, a pattern recognition module, an image processing module, a control sequence monitoring module, a threshold analysis module, a counter module and a timer module.

26. The information storage medium of claim 25, wherein the quantitative state estimator module is based on at least one of an analytical redundancy based scheme, a Luenberger observer, a robust observer, a Kalman filter, a fault detection filter, a parity space approach and a parameter estimation technique.

27. The information storage medium of claim 24, wherein the qualitative analysis is based on at least one of model based reasoning, a discrete event systems diagnostic technology, a constraint programming methodology, a bayesian network, a causal network, a neural network and an expert system.

28. The information storage medium of claim 24, wherein the diagnosis and/or prediction can be performed during at least one of a normal operation of the electronic system, a diagnostic mode and a test mode.

29. A method for generating a diagnostic inference engine for predicting or diagnosing the status of an electronic system comprising:

building a model of the system to be diagnosed from at least one of individual component models, controller models, and fault symptom tables, wherein the fault symptom tables list an output of one or more of at least one sensor and at least one virtual sensor for various operational states of the system; and generating a diagnostic engine from the system model and at least one diagnostic requirement.

30. A method for generating a diagnostic inference device for predicting or diagnosing the status of an electronic system comprising:

generating a diagnostic inference device from at least one of an individual component model, a controller model, a fault symptom table and a diagnostic requirement, wherein the fault symptom table comprises a list of outputs of one or more of at least one sensor and at least one virtual sensor for various operational states of the electronic system.

* * * * *